2,541,827

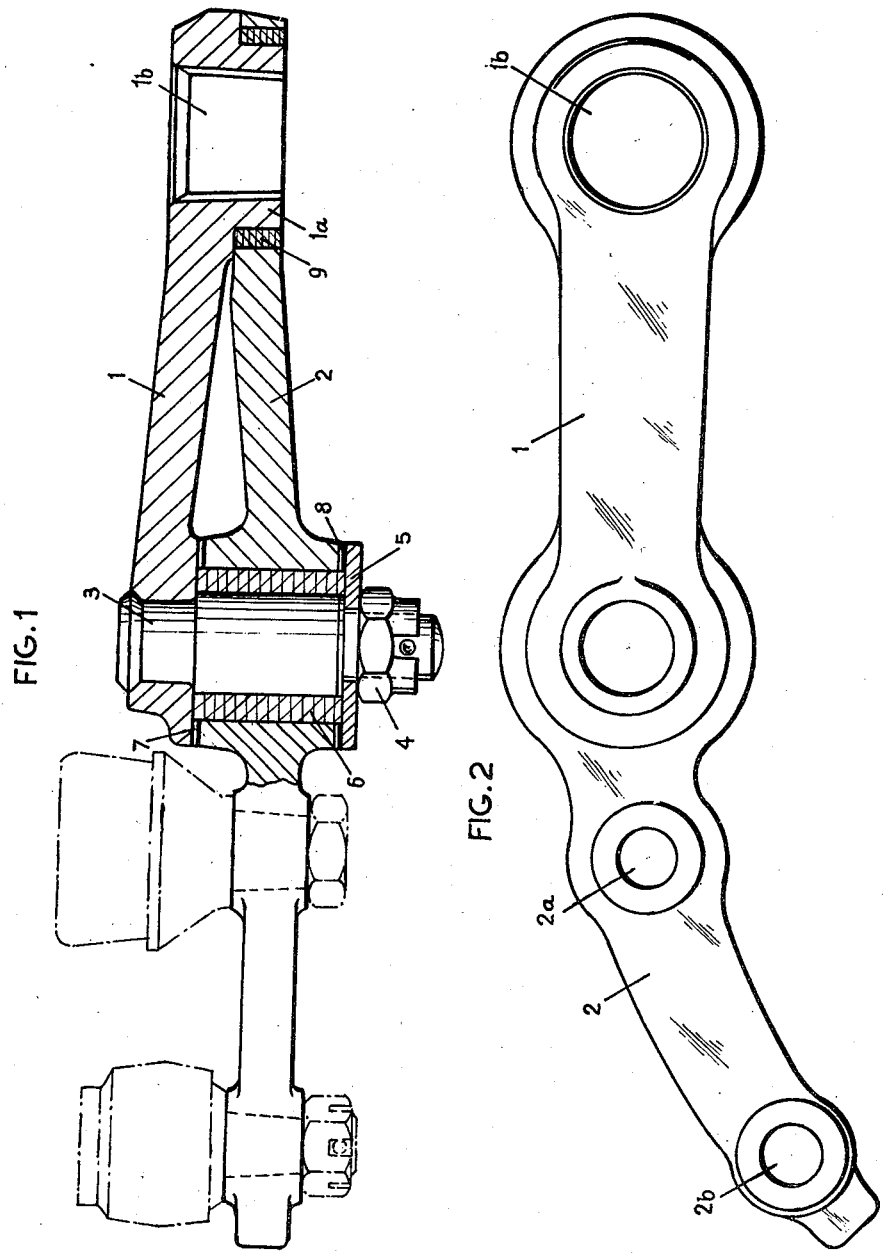
Feb. 13, 1951  A. MOSSO ET AL  2,541,827
DEVICE FOR OPERATING THE STEERING
LINKAGE OF MOTOR VEHICLES
Filed June 27, 1950
Inventors
Angelo Mosso
Vittorio Montanari
By Robert E. Burns
Attorney Patented Feb. 13, 1951

UNITED STATES PATENT OFFICE 2,541,827

DEVICE FOR OPERATING THE STEERING LINKAGE OF MOTOR VEHICLES

Angelo Mosso and Vittorio Montanari, Turin, Italy, assignors to Fiat S. p. A., Turin, Italy Application June 27, 1950, Serial No. 170,562
In Italy June 30, 1949

2 Claims. (Cl. 74—470)

This invention relates to a device for driving the steering linkage of motor vehicles, consisting of two levers pivoted on the same axis and connected together through the interposition of at least one rubber sleeve forming a resilient torque coupling.

The device affords a simple and inexpensive means of driving the steering linkage which fully isolates the linkage and steering mechanism unit from the steering wheel, in order to leave the latter unaffected by the shocks on the wheels.

The accompanying drawing shows an embodiment of the invention.

Figure 1 is a part longitudinal section of the device;

Figure 2 is a plan view of Figure 1.

1 and 2 denote two levers mounted for rotation about a common pivot.

The lever 1 is provided at one end with a hub 1a engaging through the interposition of a rubber sleeve 9 the end of the lever 2. The tapped hole 1b in said hub engages the pivot (not shown) set in rotation by the steering mechanism actuated by the steering wheel.

A nut 4 is screwed on the end of the pivot 3 and rests on a disc 5 connecting the levers 1 and 2 through the interposition of a rubber sleeve 6 situated between the pivot 3, which is fixedly connected with the lever 1, and the hub of the lever 2.

7 and 8 denote metal discs interposed between the opposite surfaces of levers 1 and 2 and of lever 2 and disc 5, respectively.

The above described construction affords a resilient torque coupling formed by the rubber member 6 which prevents transmission to the steering wheel of shocks transmitted by the wheels to the steering linkage, of which the elements are connected to the holes 2a, 2b of the lever 2.

What we claim is:

1. Device for operating the steering linkage of motor vehicles, comprising a lever having at one end a hub and at its other end a pivot, a rubber sleeve forming a torque coupling fitted on said pivot, a second double-armed lever having an intermediate hub fitted on said rubber sleeve, an arm for carrying the fittings for the steering linkage and the other arm being pivoted to the hub of the first mentioned lever, a rubber sleeve interposed between said hub and arms.

2. Device as claimed in claim 1, in which the rubber sleeve acting as torque coupling is clamped between the lever carrying the pivot and a disc.

ANGELO MOSSO.
VITTORIO MONTANARI.

No references cited.